(12) United States Patent
Schaemann et al.

(10) Patent No.: US 10,243,472 B2
(45) Date of Patent: Mar. 26, 2019

(54) VALLEY TO VALLEY SWITCHING IN QUASI-RESONANT MODE FOR DRIVER

(71) Applicant: Infineon Technologies Austria AG, Villach (AT)

(72) Inventors: Marcus Schaemann, Munich (DE); Josef Neulinger, Petershausen (DE); Martin Krueger, Oberschleissheim (DE); Torsten Hinz, Augsburg (DE)

(73) Assignee: Infineon Technologies Austria AG, Villach (AT)

( * ) Notice: Subject to any disclaimer, the term of this patent is extended or adjusted under 35 U.S.C. 154(b) by 469 days.

(21) Appl. No.: 14/569,044

(22) Filed: Dec. 12, 2014

(65) Prior Publication Data

US 2015/0244272 A1 Aug. 27, 2015

Related U.S. Application Data

(60) Provisional application No. 61/945,013, filed on Feb. 26, 2014.

(51) Int. Cl.
| | |
|---|---|
| *H02M 3/335* | (2006.01) |
| *H05B 33/08* | (2006.01) |
| *H02M 1/36* | (2007.01) |
| *H02M 1/12* | (2006.01) |
| *H02M 7/517* | (2006.01) |
| *H02M 1/08* | (2006.01) |
| *H02M 1/00* | (2006.01) |

(52) U.S. Cl.
CPC .... *H02M 3/33523* (2013.01); *H05B 33/0815* (2013.01); *H02M 1/08* (2013.01); *H02M 1/12* (2013.01); *H02M 1/36* (2013.01); *H02M 7/517* (2013.01); *H02M 2001/0058* (2013.01); *Y02B 70/1433* (2013.01); *Y02B 70/1491* (2013.01)

(58) Field of Classification Search
CPC ............... H02M 3/33523; H02M 1/08; H02M 2001/0058; H02M 3/335; H05B 33/0815; Y02B 70/1433; Y02B 70/1491
USPC ....................................................... 363/21.18
See application file for complete search history.

(56) References Cited

U.S. PATENT DOCUMENTS

| | | |
|---|---|---|
| 6,341,073 B1 | 1/2002 | Lee |
| 8,094,468 B2 | 1/2012 | Yang et al. |
| 8,482,937 B2 | 7/2013 | Lin et al. |
| 2002/0085394 A1 | 7/2002 | Giannopoulos et al. |

(Continued)

FOREIGN PATENT DOCUMENTS

| | | |
|---|---|---|
| CN | 1416613 A | 5/2003 |
| CN | 101488714 A | 7/2009 |

(Continued)

OTHER PUBLICATIONS

Office Action, in the Chinese language, from counterpart Chinese Application No. 201510088787.6, dated Nov. 16, 2016, 17 pp.

*Primary Examiner* — Harry R Behm
*Assistant Examiner* — Lorena D Bruner
(74) *Attorney, Agent, or Firm* — Shumaker & Sieffert, P.A.

(57) ABSTRACT

Techniques are described to adjust the time when a switch is turned on from the time of one voltage valley to the time of another voltage valley for controlling an average load current or average load voltage. In some examples, the adjustment is instantaneous, and in some examples, the adjustment is gradual. Both of these example techniques provide for high switching efficiency of the switch.

20 Claims, 4 Drawing Sheets

(56) References Cited

U.S. PATENT DOCUMENTS

| | | | |
|---|---|---|---|
| 2011/0305053 A1* | 12/2011 | Lin | H02M 1/44 363/95 |
| 2013/0121049 A1 | 5/2013 | Shi et al. | |
| 2013/0181635 A1* | 7/2013 | Ling | H02M 3/33507 315/297 |
| 2013/0235621 A1* | 9/2013 | Yan | H02M 3/33507 363/21.12 |
| 2013/0300307 A1* | 11/2013 | Ren | H02M 1/4258 315/219 |
| 2013/0301309 A1 | 11/2013 | Chen | |
| 2014/0029316 A1* | 1/2014 | Adragna | H02M 3/33523 363/21.18 |
| 2014/0198540 A1 | 7/2014 | Xu | |
| 2015/0062981 A1 | 3/2015 | Fang | |

FOREIGN PATENT DOCUMENTS

| | | |
|---|---|---|
| CN | 201774456 U | 3/2011 |
| CN | 102208871 A | 10/2011 |
| CN | 102891603 A | 1/2013 |
| CN | 103066868 A | 4/2013 |

\* cited by examiner

VALLEY TO VALLEY SWITCHING IN QUASI-RESONANT MODE FOR DRIVER

This application claims the benefit of U.S. Provisional Application 61/945,013 filed Feb. 26, 2014, the entire content of which is incorporated by reference herein.

TECHNICAL FIELD

The disclosure relates to controlling current or voltage at a load with a driver.

BACKGROUND

A driver can be used to control the amount of current flowing through a load in order to maintain a target average current flowing through the load or to maintain a target average voltage at the load. As one example, the driver may control how long current flows through the load and how often current flows through the load in order to maintain the desired average current flowing through the load or to maintain the desired average voltage at the load.

SUMMARY

This disclosure describes techniques for maintaining high switching efficiency for a switch that a driver turns on and off to control the average current flow through a load (referred to as average load current) or to control the average voltage level at the load (referred to as average load voltage). For example, the driver turns on and off the switch to control the amount of current that flows through the load so that the average load current or the average load voltage is approximately equal to a target current level or target voltage level.

In one example, when the load current or load voltage needs to change due to a change in the target current level or target voltage level, the driver adjusts the time when the switch turns on (e.g., adjusts the turn-on time or on-time of the switch) to a time when the least amount of energy will be needed to turn on the switch, while allowing the appropriate amount of current to flow through the load to achieve the average load current level or average load voltage level. In addition, in this example, the driver instantaneously adjusts one or more switch operational parameters to compensate for the sudden change in the amount of current that would otherwise flow through the load due to the adjustment in the turn-on time of the switch (e.g., the time when the switch is turned on).

In another example, when the load current or load voltage needs to change due to a change in the target current level or target voltage level, the driver gradually adjusts the turn-on time of the switch from one voltage valley to another voltage valley and through to an intermediate on-time that may be a less optimal on-time (e.g., a time when high switch efficiency of the switch is not achieved). In this example, the driver gradually adjusts the turn-on time, while allowing the appropriate amount of current to flow through the load to achieve the average load current level or average load voltage level. Also, in this example, a feedback control loop of the driver gradually adjusts one or more switch operational parameters as the driver adjusts the turn-on time to compensate for the changes in the amount of current that would otherwise flow through the load due to the adjustment in the turn-on time of the switch.

In one example, the disclosure describes a method for controlling power delivered to a load, the method comprising determining whether or not to adjust a turn-on time of a switch from a first time associated with a first voltage valley in an oscillating voltage at a node of the switch to a second time associated with a second voltage valley in the oscillating voltage at the node of the switch, determining one or more switch operational parameters for the switch such that if the turn-on time is adjusted from the first time to the second time an amount of power delivered to the load is substantially the same immediately before the adjustment and immediately after the adjustment, adjusting the turn-on time of the switch to the second time based on the determination to adjust the turn-on time, and setting the one or more switch operational parameters for the switch based on the determined one or more switch operational parameters.

In one example, the disclosure describes a driver system for controlling power delivered to a load, the driver system comprising a transformer comprising a primary side that includes a first coil and a secondary side that includes a second coil, wherein the load is connected to the secondary coil, a switch coupled to the first coil, and a driver coupled to the switch and configured to determine whether or not to adjust a turn-on time of the switch from a first time associated with a first voltage valley in an oscillating voltage at a node of the switch to a second time associated with a second voltage valley in the oscillating voltage at the node of the switch, determine one or more switch operational parameters for the switch such that if the turn-on time is adjusted from the first time to the second time an amount of power delivered to the load is substantially the same immediately before the adjustment and immediately after the adjustment, adjust the turn-on time of the switch to the second time based on the determination to adjust the turn-on time, and set the one or more switch operational parameters for the switch based on the determined one or more switch operational parameters.

In one example, the disclosure describes a driver for controlling power delivered to a load, the driver comprising a controller configured to determine whether or not to adjust a turn-on time of a switch from a first time associated with a first voltage valley in an oscillating voltage at a node of the switch to a second time associated with a second voltage valley in the oscillating voltage at the node of the switch, and determine one or more switch operational parameters for the switch such that if the turn-on time is adjusted from the first time to the second time an amount of power delivered to the load is substantially the same immediately before the adjustment and immediately after the adjustment, and a pulse width modulation (PWM) unit configured to adjust the turn-on time of the switch to the second time based on the determination to adjust the turn-on time, and set the one or more switch operational parameters for the switch based on the determined one or more switch operational parameters.

In one example, the disclosure describes a method for controlling power delivered to a load, the method comprising determining whether or not to adjust a turn-on time of a switch from a first time associated with a first voltage valley in an oscillating voltage at a node of the switch so that an average amount of current flowing through the load or an average amount of voltage at the load is approximately equal to a target current load level or a target voltage load level, determining a second time associated with a second voltage valley in the oscillating voltage, adjusting gradually the turn-on time of the switch from the first time to the second time, through an intermediate time associated with a non-valley voltage in the oscillating voltage at the node of the switch, based on the determination to adjust the turn-on time, and adjusting gradually one or more switch operational parameters for the switch to keep the amount of power delivered to the load approximately constant during the gradual adjustment of the turn-on time of the switch from the first time to the second time.

In one example, the disclosure describes a driver system for controlling power delivered to a load, the driver system comprising a transformer comprising a primary side that includes a first coil and a secondary side that includes a second coil, wherein the load is connected to the second coil, a switch coupled to the first coil, and a driver coupled to the switch and configured to determine whether or not to adjust a turn-on time of the switch from a first time associated with a first voltage valley in an oscillating voltage at a node of the switch so that an average amount of current flowing through the load or an average amount of voltage at the load is approximately equal to a target current load level or a target voltage load level, determine a second time associated with a second voltage valley in the oscillating voltage, adjust gradually the turn-on time of the switch from the first time to the second time, through an intermediate time associated with a non-valley voltage in the oscillating voltage at the node of the switch, based on the determination to adjust the turn-on time, and adjust gradually one or more switch operational parameters for the switch to keep the amount of power delivered to the load approximately constant during the gradual adjustment of the turn-on time of the switch from the first time to the second time.

In one example, the disclosure describes a driver for controlling power delivered to a load, the driver comprising a controller configured to determine whether or not to adjust a turn-on time of a switch from a first time associated with a first voltage valley in an oscillating voltage at a node of the switch so that an average amount of current flowing through the load or an average amount of voltage at the load is approximately equal to a target current load level or a target voltage load level, determine a second time associated with a second voltage valley in the oscillating voltage, adjust gradually the turn-on time of the switch from the first time to the second time, through an intermediate time associated with a non-valley voltage in the oscillating voltage at the node of the switch, based on the determination to adjust the turn-on time, and adjust gradually one or more switch operational parameters for the switch to keep the amount of power delivered to the load approximately constant during the gradual adjustment of the turn-on time of the switch from the first time to the second time.

The details of one or more techniques of the disclosure are set forth in the accompanying drawings and the description below. Other features, objects, and advantages of the disclosure will be apparent from the description and drawings, and from the claims.

DETAILED DESCRIPTION

Figure 1:
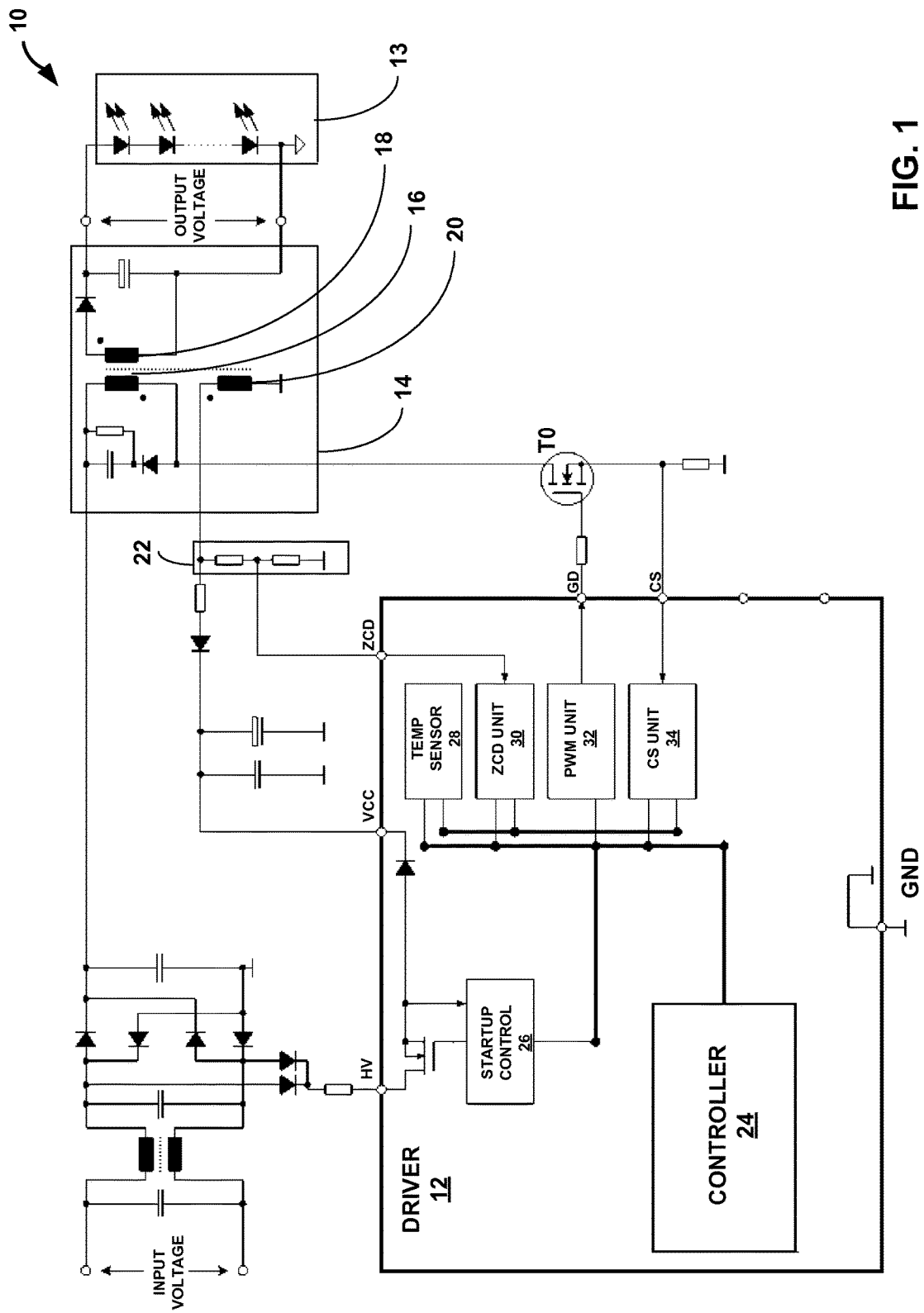
FIG. 1 is a circuit diagram illustrating an example of a driver system in accordance with one or more examples described in this disclosure.

A driver such as a light-emitting-diode (LED) driver or a power adapter, as two examples, can be used to control the amount of current that flows through a load that is connected to the driver (e.g., one or more LEDs in the example where the driver is an LED driver) so that the average amount of current flowing through the load (referred to as average load current) or the average voltage level at the load (referred to as average load voltage) is at a target current level or target voltage level. In this disclosure, the voltage level at the load refers to the potential across the load.

In some examples, the load is connected to a flyback converter and a switch. However, topologies other than a flyback converter are possible, and the techniques described in this disclosure should not be considered limited to a flyback converter topology. The driver turns the switch on and off to control the amount of current that flows through the switch to control the average load current or average load voltage.

When current is flowing through the load and the switch is on, a voltage at a node of the switch is at a certain voltage level. When the current flowing through a coil (e.g., an indicator) connected to the load reaches zero and the switch is off, a voltage at the node of the switch tends to oscillate creating an oscillating voltage with voltage peaks and voltage valleys at the node of the switch. The node of the switch where the voltage may oscillate is referred to as the switch node, and voltage at the switch node is referred to as the switch node voltage.

As one example, the switch may be a transistor, the when the switch is on the transistor is in the ohmic mode or active mode, and when the switch is off the transistor is the cutoff mode. In examples where the switch is a transistor, the node of the switch where the voltage oscillates may be the drain node of the transistor. In other words, the switch node may be the drain node of the transistor, and the switch node voltage may be the voltage at the drain node of the transistor (i.e., the drain node voltage). However, the examples described in this disclosure are not limited to a transistor being the switch.

In some cases, the difference in the switch node voltage at a valley of the oscillating voltage and the switch node voltage when the switch is on is the smallest as compared to the difference in the switch node voltage at other non-valley voltage levels of the oscillating voltage and the switch node voltage when the switch is on. For instance, assume that the voltage at the switch node when the switch is on is X, and the voltage at a valley of the oscillating voltage at the switch node when the switch is off is Y. In this example, Y minus X is smaller than a non-valley voltage at the switch node during oscillation minus X.

Accordingly, turning the switch on at a valley of the oscillating voltage may maximize the switching efficiency of the switch because the voltage at the switch node, at a valley of the oscillating voltage when the switch is off, is closest to the voltage at the switch node when the switch is on. Stated another way, the least amount of energy is needed to turn the switch back on when the switch is turned back on at a valley of the oscillating voltage as compared to turning the switch back on at a non-valley of the oscillating voltage because the difference in the switch node voltage when the switch is on and the switch node voltage during the oscillation is the smallest at a valley of the voltage oscillation. Switching the switch on (e.g., turning on the transistor, as one example) at a voltage valley is referred to as quasi-resonant switching.

In some examples, the amount of current that needs to flow through the load may change to achieve a target current or voltage level. For instance, in the example where the load is one or more LEDs, a user may dim or brighten the LEDs, which requires a reduction or increase the amount of current that needs to flow through the load, respectively. Changes in the amount of current that needs to flow through the load may require adjusting the time when the switch is turned on, and possibly to a time when the oscillating voltage is at a non-valley voltage level. However, adjusting the time when the switch is turned on to a non-valley voltage level may result in switching inefficiencies. For example, turning on the switch at a non-valley voltage level may require more energy for the switch node voltage to return to the voltage level when the switch is on as compared to the energy that is needed for the switch node voltage to return to the voltage level when the switch is on at an instance when the oscillating voltage is at a valley voltage level.

In the oscillating voltage, there are multiple peaks and valleys, and in some cases, if the time when the switch is to turn on changes (i.e., the turn-on time of the switch changes), it may be possible to turn the switch on at a subsequent or previous valley. In this case, switching efficiency is maintained, or very slightly impacted, because the switch still turns on at a voltage valley, albeit a different voltage valley. However, such sudden changes in the time when the switch turns on causes a stepwise jump (i.e., a relatively large instantaneous change) in the amount of current that flows through the load if no compensation is applied.

Stepwise jumps in the amount of current that flows through the load may be undesirable, and gradual changes in the amount of current that flows through the load may be desirable. For instance, in the context of lighting, if the LEDs are being dimmed or brightened, a stepwise jump in the amount of current that flows through the LEDs results in a flicker of the LEDs which viewers may perceive undesirably. Viewers may generally prefer gradual changes in the LED output as the LEDs are being dimmed or brightened.

In the techniques described in this disclosure, a driver that controls the amount of current flowing through a load may determine whether a change in the time when a switch is to be turned on (e.g., whether an adjustment in the turn-on time of the switch) is needed to adjust the amount of current flowing through the load to so that the average load current or average load voltage is approximately equal to a target current or voltage level. In the techniques described in this disclosure, the current that flows through the load flows through the switch when the switch is on. If the driver determines that a change in the time when the switch is turned on (i.e., turn-on time) is needed, the driver may implement one or more of the examples techniques described in this disclosure.

Also, in some examples, prior to adjustment, the driver turns on the switch at a time associated with a first voltage valley of the oscillating voltage. In other words, in some examples, before the amount of current flowing through the load is changed, the driver may be configured to turn on the switch at a time of a first voltage valley in the oscillating voltage. It should be understood that the "first voltage valley" does not necessarily mean the very first instance that a valley exists, but is instead used to differentiate the voltage valleys. For instance, there may be multiple voltage valleys and a first voltage valley, as used in this context, is meant to refer to one of these voltage valleys. A second voltage valley is meant to refer to another one of these voltage valleys, and may be an earlier voltage valley or a subsequent voltage valley to the first voltage valley.

In one example, the driver may determine a time associated with a second voltage valley in the oscillating voltage and adjust the time when the switch is turned on (e.g., adjust the turn-on time) to the time of the second voltage valley. The second voltage valley may be a voltage valley earlier than the first voltage valley or subsequent to the first voltage valley based on whether increase or decrease in the current through the load is needed to achieve the target current or voltage level. As described above, changing the time when the switch is turned on from one voltage valley to another may cause a stepwise jump in the amount of current flowing through the load.

Accordingly, in this example, the driver may compensate for the sudden change in the amount of current flowing through the load. For example, the driver may instantaneously adjust one or more switch operational parameters so that the amount of power delivered to the load immediately before the change in the turn-on time of the switch is the same as the amount of power delivered to the load immediately after the change in the turn-on time of the switch. In other words, because the current flowing through the load may instantaneously jump when the time the switch is turned on is adjusted from one voltage valley to another voltage valley, the driver may instantaneously adjust one or more operational parameters to counteract the jump in the current from the change in the time when the switch is turned on. This example technique may be referred to as valley-to-valley switching with power compensation.

One example of the switch operational parameter is a switch on-duration that indicates the amount of time the driver keeps the switch on, in which the driver turns off the switch after the duration of switch on-duration. Another example of the switch operational parameter is a peak-current amplitude threshold of the current flowing through the switch, in which the driver turns off the switch when the current flowing through the switch reaches the amplitude threshold.

As another example, rather than adjusting the turn-on time of switch from a time associated with one voltage valley to a time associated with another voltage valley, the driver may adjust the time when the switch turns on at another voltage valley gradually. For instance, the driver may adjust the turn-on time of the switch from one turn-on time of voltage valley to a turn-on time of another voltage valley, and through an intermediate on-time that is not at a voltage valley, and at a voltage level of the oscillating voltage where sub-optimal switching efficiency occurs. For example, as the LEDs are dimmed, the driver may gradually increase the time when the switch is turned back on to reduce the amount of current flowing through the load. In this example, the gradual increase in the time when the switch is turned back on results in cases where the switch turns on and the oscillating voltage is not a voltage valley causing sub-optimal switching efficiency.

In accordance with the techniques described in this disclosure, in some examples, the driver may gradually adjust the switch on-time (i.e., gradually adjust the turn-on time of the switch) until the switch on-time is at a voltage valley allowing for high switching efficiency (i.e., until the turn-on time of the switch is associated with a time of a voltage valley). However, gradually adjusting the turn-on time of the switch to a time associated with a voltage valley causes changes in the amount of current flowing through the load.

In some examples, a feedback control loop of the driver may already be configured to adjust switch operational parameters to compensate for changes in the input voltage and other factors that affect the amount of current that flows through the load. This control loop of the driver may not be fast enough to compensate for stepwise changes in the current that flows through load, such as the case for the above example. Accordingly, in the above example, the driver may instantaneously adjust the one or more switch operational parameters. However, this control loop of the driver may be fast enough to compensate for gradual changes in the current, such as those that would occur due to gradually adjusting the turn-on time of the switch from the a first on-time when the oscillating voltage is at a voltage valley to a second time when the oscillating voltage is at a voltage valley, and through an intermediate turn-on time when the oscillating voltage is at a non-valley. Due to the gradual adjustment of the time when the switch is turned on, this example technique may be referred to as valley-to-valley with soft handover.

In either the valley-to-valley switching with power compensation or the valley-to-valley with soft handover, once the turn-on time of the switch is set to voltage valley, the driver may further adjust other operational parameters of the switch so that the average current following through the load or the average voltage at the load is equal to the target current load level or target voltage load level. In this way, high switching efficiency may be realized while allowing the average current through the load or the average voltage at the load to equal the target current level or target voltage level.

FIG. 1 is a circuit diagram illustrating an example of a driver system in accordance with one or more examples described in this disclosure. For example, FIG. 1 illustrates driver system 10 which includes driver 12 and load 13. Examples of driver system 10 include a circuit board with the illustrated components and driver 12, and a plug for plugging into a power source, such as an AC input source.

Driver 12 may be formed in an integrated circuit (IC) chip. Alternatively, one or more of the units of driver 12 may be formed in distinct IC chips. The units of driver 12 are illustrated as functional blocks to ease with understanding and may be combined or separated within driver 12. The units of driver 12 may be implemented as hardware or software or firmware executing on hardware.

In the example illustrated in FIG. 1, load 13 includes a plurality of light-emitting-diodes (LEDs) connected in series. Accordingly, driver 12 is an example of a LED driver in FIG. 1. Another example of driver 12 includes a power adapter, where load 13 is a laptop computer. In general, driver 12 may be a circuit configured to deliver power and load 13 may be a unit that receives power. For ease of description, the techniques described in this disclosure are described from the perspective of an LED driver system. However, the techniques described in this disclosure should not be considered so limiting and may be extended to other driver systems.

The LEDs of load 13 illuminate when current flows through them. As illustrated, flyback converter 14 outputs the current to load 13 that causes the LEDs of load 13 to illuminate. For example, an AC input source (e.g., 85 to 305 V AC) connects to driver system 10. The AC voltage of the input source is rectified through a full-wave rectifier (e.g., the four diodes coupled to the AC input source) and filtered with a capacitor. In examples where the input source is a DC input source, the rectifier may not be necessary, and the capacitor that is connected to the rectifier in FIG. 1 may be optionally connected to the DC input source.

Driver 12 is connected to the full-wave rectifier and in this manner receives power from the input source. For example, the local voltage for driver 12 (referred to as VCC) is generated from the voltage outputted by the full-wave rectifier. The components and units of driver 12 are powered by the VCC generated from the output of the full-wave rectifier.

Flyback converter 14 similarly receives power from the input source via the full-wave rectifier. It should be understood that the techniques described in this disclosure are described with respect to a flyback converter for ease of illustration. The techniques described in this disclosure may be extended to other converter topologies.

As illustrated, flyback converter includes a transformer that includes a primary side that includes a primary winding (referred to as coil 16 for ease), a secondary winding (referred to as coil 18 for ease), and a sensing winding (referred to as coil 20 for ease). Coil 16 connects to full-wave rectifier and switch T0. In the example illustrated in FIG. 1, switch T0 is an n-type transistor, and therefore, coil 16 is illustrated as being connected to the drain node of switch T0. For ease of description, the examples are described with respect to coil 16 of the primary side being connected to a drain node of switch T0. However, the techniques described in this disclosure are not so limited and switch T0 may be a p-type transistor. In some examples, switch T0 may be power transistor such as a power metal-oxide-semiconductor field-effect-switch (MOSFET), a Gallium Nitride (GaN) FET, insulated gate bipolar transistor (IGBT), or other types of transistors. In some example, switch T0 may not be transistor and may be other types of switches.

In general, switch T0 may include a first node that couples to coil 16, a second node that controls whether switch T0 is on or off, and a third node through which current outputs switch T0. As an example, in examples where switch T0 is a transistor, the first node of switch T0 that couples to coil 16 may a drain node of the transistor, the second node of switch T0 that controls whether switch T0 is on or off may be a gate node of the transistor, and the third node of switch T0 through which current outputs switch T0 may be a source node of the transistor.

In the techniques described in this disclosure, driver 12 may control when switch T0 is turned on and turned off to control the amount of current flowing through load 13 such that the average amount of current flowing through load 13 (referred to as the average load current) or the average voltage level at load 13 (referred to as the average load voltage) is at a set load current or load voltage level (e.g., at a target load current level or target load voltage level). In the example illustrated in FIG. 1, the output voltage indicates the voltage level at load 13 (e.g., the potential across the LEDs), and the current flowing through load 13 is the current flowing through the LEDs, which cause the LEDs to illuminate.

When driver 12 turns on switch T0, current flows through coil 16 (also referred to as inductor 16) and into switch T0 and through the resistor connected at the current sense (CS) pin of driver 12 to ground (GND). Current through coil 16 cannot change instantaneously, and therefore, the current through coil 16 slowly ramps up (and in some examples, linearly ramps up). The current flowing through coil 16 creates a magnetic field, and when current flowing through coil 16 is turned off, the magnetic field induces a current on coil 18 (also referred to as inductor 18) of the second side that discharges the magnetic field. The current on coil 18 flows through load 13 and illuminates the LEDs.

When driver 12 turns off switch T0, current stops flowing into switch T0. However, current does not instantaneously stop flowing through coil 16 due to the inductance of coil 16. Instead, the current through coil 16 slowly ramps down (and in some examples, linearly ramps down) by flowing through the capacitor illustrated on the left of coil 16 and inside flyback converter 14. While current is flowing through coil 16, the current creates a magnetic field. When the current is turned off, the magnetic field creates a secondary current through coil 18 which slowly dissipates (e.g., linearly due to inductance) through load 13 as well and discharges the magnetic field.

If driver 12 turns switch T0 back on before the current through coil 16 and, in some examples, load 13 has reached zero (i.e., an amplitude of zero amps (0 A)), driver 12 may be considered as operating in the continuous conduction mode (CCM). If driver 12 turns switch T0 back on after the current through coil 16, and in some examples, load 13 has reached zero, driver 12 may be considered as operating in the discontinuous conduction mode (DCM). As described in more detail, the techniques described in this disclosure may operate in the DCM, where driver 12 determines when to turn switch T0 back on after the current through coil 16 and in some examples load 13 reaches zero so that average load current or average load voltage is equal to the set load current level or set load voltage level.

For instance, driver 12 may control the amount of current that flows through load 13 based on how often driver 12 turns on switch T0 and for how long driver 12 turns on switch T0. As one example, if a higher average load current is needed, driver 12 may reduce the amount of time driver 12 waits after the current through coil 16 and/or load 13 reaches zero before turning on switch T0, or driver 12 may keep switch T0 on for a longer duration, or a combination of the two. As another example, if a lower average load current is needed, driver 12 may increase the amount of time driver 12 waits after the current through coil 16 and/or load 13 reaches zero before turning on switch T0, or driver 12 may keep switch T0 on for a shorter duration, or a combination of the two.

Figure 2:
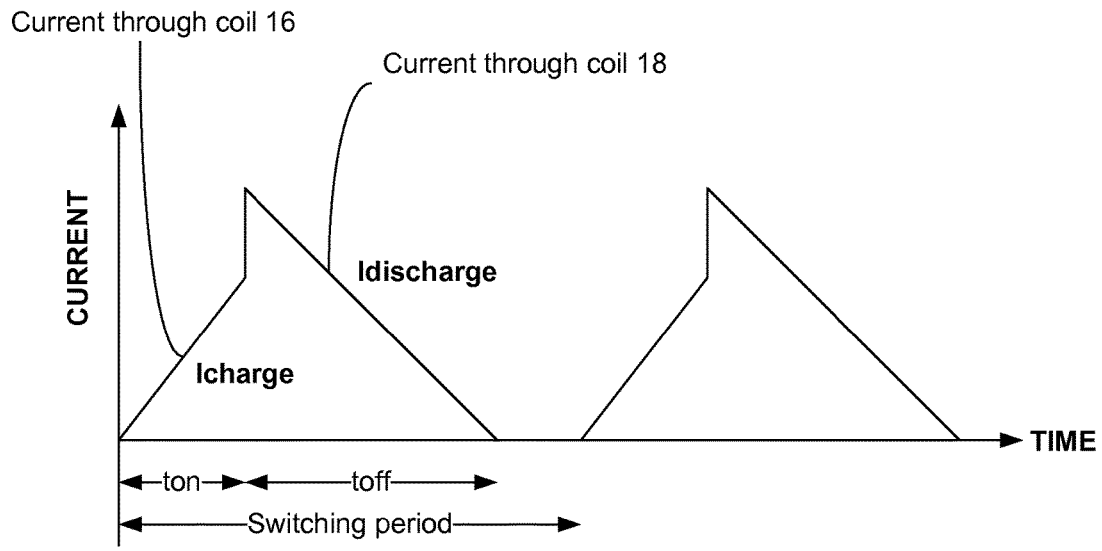
FIG. 2 is graphical diagram used to illustrate example ways in which a driver can increase or decrease the amount of current flowing through coils of a transformer.

FIG. 2 is graphical diagram used to illustrate example ways in which a driver can increase or decrease the amount of current flowing through coils of a transformer. For instance, FIG. 2 illustrates current flowing through coil 16 that is coupled to switch T0 and the current flowing through coil 18 that is coupled to load 13. For instance, the Icharge current flows through coil 16 and through switch T0. The Idischarge is the current that flows through coil 18. The current that flows through coil 18 is low-pass filtered with capacitor connected to load 13, as illustrated in FIG. 1, and the low-pass filtered current flows through load 13. Accordingly, a diagram of the current flowing through load 13 may be different than the illustrated diagram in FIG. 2 of the current flowing through coil 18.

In the example illustrated in FIG. 2, initially, driver 12 turns on switch T0 allowing current to flow through coil 16 and through switch T0, creating a magnetic field. At the end of the on-duration, driver 12 turns off switch T0, and the magnetic field induces a current that flows through load 13 and linearly ramps down due to the inductance of coil 18 until the current reaches zero through coil 18 to dissipate the magnetic field. However, in the illustrated example, driver 12 does not immediately turn switch T0 back on. Instead, there is a delay before driver 12 turns switch T0 back on. For instance, FIG. 2 illustrates the switching period. The switching period is the amount of time between one instance of driver 12 turning on switch T0 and another instance of driver 12 turning on switch T0 (i.e., the on-time of switch T0).

Based on the example illustrated in FIG. 2, there may be at least two ways in which driver 12 may control the amount of current that flows through load 13. In a first way to control the amount of current that flows through load 13, driver 12 may increase or decrease the switching period, which in effect increases the time or decreases the time when driver 12 turns on switch T0 (i.e., increases or decreases the on-time of switch T0). The switching period is indicative of frequency at which driver 12 turns on switch T0.

If the amount of current that flows through load 13 needs to increase so that the average load current or average load voltage are approximately equal to the set load current level or load voltage level (e.g., target load current level or target load voltage level), driver 12 may turn on switch T0 more frequently (i.e., reduce the switching period). If the amount of current that flows through load 13 needs to decrease so that the average load current or average load voltage are approximately equal to the set load current level or load voltage level, driver 12 may turn on switch T0 less frequently (i.e., increase the switching period).

In a second way to control the amount of current that flows through load 13, driver 12 may increase or decrease the switch on-duration (i.e., increase or decrease ton). For example, if the amount of current that flows through load 13 needs to increase so that the average load current or average load voltage are approximately equal to the set load current level or load voltage level, driver 12 may increase the switch on-duration. If the amount of current that flows through load 13 needs to decrease so that the average load current or average load voltage are approximately equal to the set load current level or load voltage level, driver 12 may decrease the switch on-duration.

Increasing or decreasing the switch on-duration also affects the switching period because the switch off-duration (toff) may be constant or vary only minimally. For instance, driver 12 may not be able to adjust the switch off-duration because the switch off-duration is a function of the inductance of the transformer that includes the primary side that includes coil 16 and the secondary side that includes coil 18, and capacitors connected to the transformer.

Accordingly, if the switch on-duration changes, the switching period (i.e., the on-time of switch T0) changes correspondingly, meaning that the switching period is a function of the switch on-duration. As described in more detail below, in some examples, the computations needed to determine when switch T0 should turn on may become complicated. Therefore, in some examples, the techniques described in this disclosure may approximate the time when switch T0 should turn on based on an assumption that the switching period is not a function of the switch on-duration or that the switch on-duration has little impact on the switching period. However, the techniques described in this disclosure are not so limited. The techniques described in this disclosure are also applicable to situations where the effect of the changes to the switch on-duration on the switching period are accounted for.

In this way, if driver 12 is not capable of processing computationally intensive tasks, driver 12 may implement the example techniques in which it is assumed that the switching period is not a function of the switch on-duration. If computational efficiency of driver 12 is capable of processing computationally intensive tasks, driver 12 may implement example techniques in which the effect of the switch on-duration on the switching period is accounted for.

As described above, one way in which driver 12 controls the amount of current that flows through load 13 is by adjusting the switch on-duration. There may be at least two ways in which driver 12 adjusts the switch on-duration. In one example, driver 12 may define the switch on-duration, and after the switch on-duration elapses, driver 12 may turn off switch T0. As another example, driver 12 may define a peak-current threshold amplitude of Icharge, where Icharge may be current flowing through the transformer and switch T0. In this example, when Icharge reaches the peak-current threshold amplitude, as determined by the voltage across the resistor connected to the CS pin of driver 12, driver 12 may turn off switch T0.

Whether driver 12 defines the amount of time switch T0 is on (i.e., the on-duration) may be matter of design choice. For example, for power adapters, driver 12 may define the on-duration based on the peak-current threshold amplitude to provide more constant power transfer. If driver 12 defines the amount of time switch T0 is on based on the defined time, driver 12 may minimize reactive power. Active power refers to components consuming the power, and reactive power refers to transfer back and forth of power between the components and the input source. Defining the amount of time switch T0 is on based on the defined time cause the components to appear like a constant resistive load, which provides better power factor (i.e., provides better active power consumption and minimizes reactive power). Therefore, whether better constant power transfer is needed or whether better power factors is needed may determine whether driver 12 defines the actual amount of time switch T0 is on to define the on-duration or whether driver 12 defines the peak-current threshold amplitude to define the on-duration.

In the discontinuous conduction mode (DCM), driver 12 may turn on switch T0 any time after the current through coil 16 (inductor 16) has reached zero (i.e., reached an amplitude of zero amps). However, there may be certain times when turning switch T0 back on is more beneficial than other times.

Figure 3:
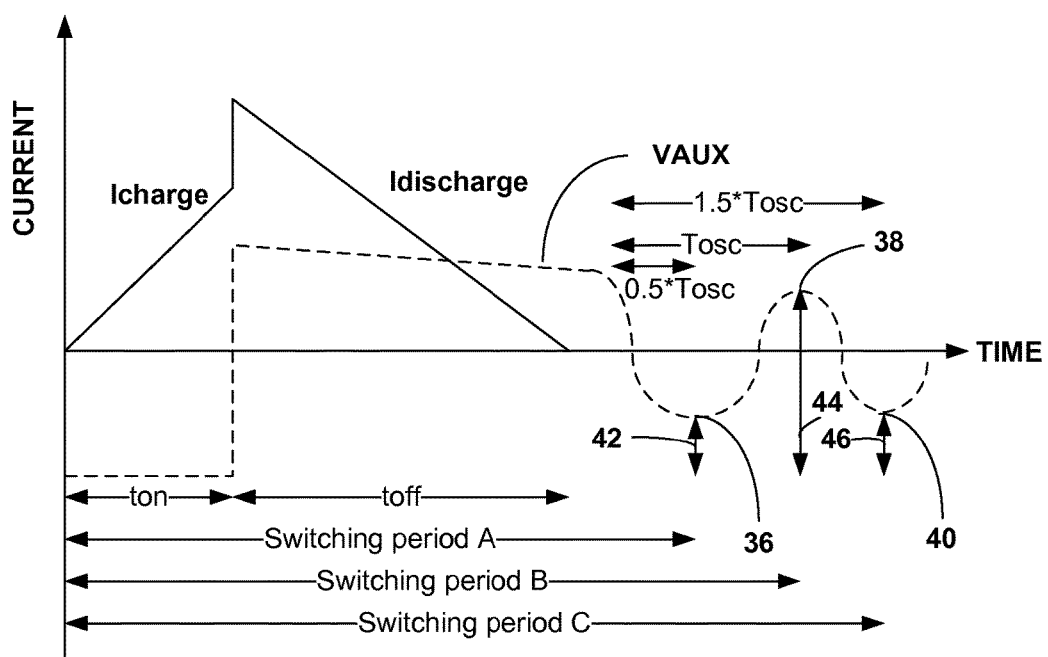
FIG. 3 is a graphical diagram illustrating behavior of a voltage at a switch node when the switch is turned off and there is current flowing through a coil coupled to the load becomes zero.

FIG. 3 is a graphical diagram illustrating behavior of a voltage at a switch node when the switch is turned off and there is no current flowing through coil 16. For example, FIG. 3 illustrates the behavior of a voltage VAUX that is indicative of the voltage at a switch node of switch T0 (in dashed line) superimposed on a graphical illustration of the Icharge and Idischarge (which are similar to the Icharge and Idischarge illustrated in FIG. 2).

For example, the voltage VAUX may be a reflection of the voltage at the switch node of switch T0 that connects to coil 16 (e.g., the drain node in examples where switch T0 is a transistor). In general, voltage VAUX illustrates the behavior of the voltage at the switch node of T0 that connects to coil 16. As illustrated in FIG. 3, during the switch on-duration, the switch node voltage (e.g., the drain voltage of switch T0) is at a constant low voltage level. This constant low voltage level is referred to as the on-duration switch node voltage level. During the switch off-duration, although switch T0 is off, current is still flowing through coil 16, and the switch node voltage is at a relatively constant high voltage level (there may be slight droop).

However, when current though coil 16 reaches zero and switch T0 is off, the switch node voltage begins to oscillate with a period of Tosc. The frequency of the oscillation (i.e., 1/Tosc) is a function of the components connected to switch T0, and driver 12 may not be able to control the frequency of the oscillation. During start-up (e.g., when driver system 10 is connected to the input source), startup control 26 of driver 12 may determine the oscillation period Tosc.

The voltage oscillation at the switch node creates voltage peaks and voltage valleys. For example, as illustrated in FIG. 3, the oscillating voltage (i.e., the voltage that the drain node of the switch when (1) current through coil 16 is zero and (2) switch T0 is off) includes voltage valley 36 and voltage valley 40 and voltage peak 38. Voltage valley 36 occurs at time 0.5*Tosc after toff, voltage valley 40 occurs at time 1.5*Tosc after toff, and voltage peak 38 occurs at time Tosc after toff.

FIG. 3 also illustrates three hypothetical switching periods: switching period A, switching period B, and switching period C, where each switching period illustrate a time when switch T0 is turned back on (i.e., each illustrate an on-time of switch T0). In FIG. 3, switching period A is at the time of voltage valley 36, switching period B is at the time of voltage peak 38, and switching period C is at the time of voltage valley. In some examples, switching efficiency of switch T0 may be maximized if driver 12 turns switch T0 back on at voltage valley 36 or voltage valley 40.

In the techniques described in this disclosure, the amount of energy needed to turn switch T0 back on may be related to the difference between the on-duration switch node voltage level and the voltage level of the oscillating voltage. The smaller the difference between the on-duration switch node voltage level and the voltage level of the oscillating voltage, the smaller the amount of energy that is needed to allow the switch node voltage to return to the on-duration switch node voltage level when switch T0 is turned back on. The amount of energy needed to return the switch node voltage to the on-duration node voltage level when switch T0 is turned back on is indicated by a switching efficiency of switch T0.

In FIG. 3, voltage difference 42 represents the difference in the voltage at voltage valley 36 and the on-duration switch node voltage level (e.g., the voltage at the drain node of switch T0 when switch T0 is on). Voltage difference 44 represents the difference in the voltage at voltage peak 38 and the on-duration switch node voltage level, and voltage difference 46 represents the difference in the voltage at voltage valley 40 and the on-duration switch node voltage level.

As illustrated, voltage difference 42 is the smallest voltage difference between the on-duration switch node voltage level and any other voltage level of the oscillating voltage. Therefore, if driver 12 turns switch T0 back on when the oscillating voltage is at voltage valley 36, then the least amount of energy would be needed to return the switch node voltage to the on-duration node voltage level, which results in the highest switching efficiency. As illustrated, voltage difference 46 is the next smallest voltage difference between the on-duration switch node voltage level and any other voltage level (except voltage valley 36) of the oscillating voltage. Therefore, if driver 12 turns switch T0 back on when the oscillating voltage is at voltage valley 40, then the next least amount of energy would be needed to return the switch node voltage to the on-duration node voltage level, which results in almost the highest switching efficiency. As illustrated, voltage difference 44 is the largest voltage difference between the on-duration switch node voltage and any other voltage level of the oscillating voltage. Therefore, if driver 12 turns switch T0 back on when the oscillating voltage is at voltage peak 38, then the most amount of energy would be needed to return the switch node voltage to the on-duration node voltage level, resulting in the lowest switching efficiency.

Accordingly, to achieve high switching efficiency, driver 12 may be configured to turn switch T0 on at a time of a voltage valley of the oscillating voltage. For example, a user may set the brightness level of the LEDs to the highest level by setting the load current level to the highest level. In this example, driver 12 may be configured to turn switch T0 on at the time of voltage valley 36. In other words, driver 12 may set the on-time of switch T0 equal to switching period A. Conversely, a user may set the brightness level of the LEDs to the lowest level by setting the load current level to the lowest level. In this example, driver 12 may be configured to turn switch T0 on at the time of voltage valley 40. In other words, driver 21 may set the on-time of switch T0 equal to switching period C.

It should be understood that FIG. 3 illustrates two voltage valleys for ease of illustration and description. In general, there may be multiple voltage valleys and multiple voltage peaks. Therefore, in some examples, driver 12 may be configured to turn switch T0 as any of these voltage valleys.

In the above examples, driver 12 may determine the time when switch T0 is to turn on based on when a voltage valley occurs in the oscillating voltage. Accordingly, driver 12 may need to be configured to determine when the voltage valleys occur.

Referring back to FIG. 1, the transformer includes a sensing side that includes coil 20. Coil 20 may sense the voltage at coil 16. Because coil 16 is connected to the switch node of switch T0 (e.g., the drain node in the example where switch T0 is a transistor) where the voltage oscillation occurs, coil 20 may sense the voltage at the switch node of switch T0, and feed the voltage into driver 12. For example, driver system 10 includes voltage divider 22, which is connected to the zero crossing detection (ZCD) pin of driver 12. Therefore, driver 12, via the ZCD pin, receives a fraction of the voltage that tracks the switch node voltage, which is the voltage at the node of switch T0 that is connected to flyback converter 14 (e.g., drain node of switch T0). Voltage divider 22 may be optional or incorporated into driver 12.

For example, if there is voltage oscillation at the switch node, then the voltage oscillation may be sensed by coil 20, divided by voltage divided 22, and coupled into the ZCD pin. ZCD unit 30 of driver 12 may determine when the sensed voltage drops to below zero (e.g., goes from above zero to below zero), and outputs a signal to controller 24 of driver 12 indicating that sensed voltage dropped below zero. Based on the time when the sensed voltage dropped below zero, controller 24 may determine the time when a voltage valley will occur in the oscillating voltage. For instance, the voltage valley may occur in the oscillating voltage at a quarter of the oscillation period. In some examples, startup control 26 may have already determined the oscillation period (Tosc) during startup. Therefore, when ZCD unit 30 outputs a signal to controller 24 indicating that the sensed voltage has crossed zero volts, controller 24 may determine that a voltage valley will occur in the sensed oscillating voltage approximately Tosc/4 amount of time later. Because the sensed voltage tracks the voltage at the switch node, controller 24 may determine that a voltage valley will occur in the oscillating voltage at the switch node approximately Tosc/4 amount of time later from the time the sensed voltage crossed zero from a voltage greater than zero.

In the techniques described in this disclosure, the voltage at the switch node begins to oscillate when the current through coil 16 reaches zero. Although driver 12 may not be able to determine the exact time when the oscillation began, driver 12 may still be able to determine when a voltage valley will occur based on the zero crossing detection of the sensed voltage from coil 20.

Once driver 12 determines the time when switch T0 is to turn on to achieve high switching efficiency, driver 12 may also determine the switch on-duration (ton). Again, driver 12 may not be able to control the switch off-duration (toff). Also, the time when switch T0 is to turn on also sets the switching period (e.g., switch T0 will turn on every switching period which is determined based on when high switching efficiency is realized).

To determine the switch on-duration, current sensing (CS) unit 34 receives a voltage indicative of the amount of current flowing through switch T0. For instance, as illustrated, the current flows through switch T0 and through a resistor connected to the CS pin of driver 12, creating a voltage at the CS pin which is proportional to the amount of current flowing through switch T0. CS unit 34 may output a signal to controller 24 indicative of the amount of current flowing through switch T0. In response, controller 24 may determine the switch on-duration so that average load current or average load voltage is approximately equal to the set load current or set load voltage.

In this way, controller 24 may determine the switching period of switch T0 (i.e., the time when switch T0 is turned back on after being off, also referred to as the switch on-time) and how long switch T0 is to be on (i.e., the switch on-duration). Controller 24 may then cause pulse width modulation (PWM) unit 32 to turn switch T0 on at the appropriate times based on the determined switching period and keep T0 on for the appropriate amount of time based on the determined switch on-duration.

Accordingly, CS unit 34, controller 24, and PWM unit 32 form a feedback control loop to adjust the switch on-duration for the given switching period, as determined with outputs from ZCD unit 30 and startup control 26, to control the amount of current that flows through load 13 such that the average load current or average load voltage is approximately equal to the set load current level or set load voltage level. For instance, by controlling when switch T0 turns on and off, the current flowing through coil 16 is controlled, which controls the amount of current flowing through load 13. In some examples, the internal temperature of driver 12 may require adjustments to the switch on-duration. Accordingly, temperature sensor 28 may output a signal indicative of the internal temperature to controller 24, and controller 24 may utilize the internal temperature as one of the variables for determining the switch on-duration.

However, a user may modify the set load current level or set load voltage level. For example, the set load current level may be at a level where the LEDs are the brightest, and the user may dim the LEDs, or the set load current level may be at a level where the LEDs are the least bright, and the user may brighten in the LEDs. In this example, the feedback control loop may adjust the switch on-duration so that the average load current or average load voltage are approximately equal to the set load current level or the set load voltage level (i.e., the modified level that the user set also referred to as the target load current level or the target load voltage level). In some cases, there may be a limit to how much controller 24 can adjust the switch on-duration as part of the feedback control loop.

When controller 24, as part of the feedback control loop, can no longer adjust the switch on-duration to achieve the needed average load current or average load voltage, controller 24 may adjust the switching period (e.g., adjust the switch on-time). In some examples, controller 24 may not need to wait until controller 24 can no longer adjust the switch on-duration to achieve the needed average load current or average load voltage, and may adjust the switching period (e.g., the switch on-time) at an earlier point.

Adjusting the switching period may result in switching inefficiencies. For example, referring to FIG. 3, assume that initially the switching period equals switching period A, and the user dimmed the LEDs to such a level that controller 24 needed to adjust the switching period (e.g., increase the switching period). In this example, it may be possible that to achieve the set load current or set load voltage level, controller 24 increases the switching period from switching period A to switching period B. As described above, switching period B provides the least switching efficiency because difference 44 is the greatest difference between the oscillating voltage and the on-duration switch node voltage level.

The example techniques described in this disclosure provide for ways of maintaining high switching efficiency while allowing the needed current to flow through load 13 so that the average load current or average load voltage is equal to target current load level or target voltage load level. In a first example technique, controller 24 adjusts the switching period such that the switching period instantaneously changes from a first voltage valley to a second voltage valley. In this first example technique, controller 24 also instantaneously adjusts a switch operational parameter (e.g., switch on-duration by adjusting the time or the peak-current) so that the power delivered to load 13 remains the same immediately before the adjustment in the switching period from the first voltage valley to the second voltage valley and immediately after the adjustment in the switching period from the first voltage valley to the second voltage valley. After driver 12 adjusts the switching period to the second voltage valley, if the user further modifies the target current load level or the target voltage load level, controller 24 may adjust the switch on-duration as part of the feedback control loop, and instantaneously change voltage valleys if controller 24 cannot achieve the target current load level or target voltage load level by adjusting the switch on-duration.

In a second example technique, controller 24 adjusts the switching period to through an intermediate switching period (i.e., an intermediate switch on-time) to a switching period associated with a voltage valley. This intermediate switching period may be at a non-valley voltage level of the oscillating voltage, resulting in switching inefficiencies. However, in the second example technique, controller 24 may gradually adjust the switching period until the switching period is at a voltage valley. In this second example technique, the feedback control loop may gradually adjust the switch operational parameters to correct for changes to the amount of current flowing through load 13 that cause deviation from the target current load level or target voltage load level. Similar to above, after driver 12 adjusts the switching period to the second voltage valley, if the user further modifies the target current load level or the target voltage load level, controller 24 may adjust the switch on-duration as part of the feedback control loop, and gradually adjust the turn-on time of the switch to another voltage valley if controller 24 cannot achieve the target current load level or target voltage load level by adjusting the switch on-duration.

In the second example technique, during the gradual adjustment of the turn-on time of the switch, controller 24 may adjust the turn-on time of the switch to the intermediate time associated with the non-valley voltage in the oscillating voltage. Also, during the gradual adjustment of the one or more switch operational parameters, controller 24 may adjust the one or more switch operational parameters to keep the amount of power delivered to load 13 approximately constant when the turn-on time is adjusted to the intermediate time associated with the non-valley voltage during the adjustment of the turn-on time from the first time to the second time.

The first and second example techniques are described in more detail below, but, generally, both example techniques ultimately adjust the switching period so that switch T0 turns on at a voltage valley of the oscillating voltage at the switch node (i.e., adjust the on-time so that switch T0 turns on at a voltage valley). Both the first and second example techniques may be advantageous over other techniques because the first and second example techniques adjust the switch on-time to equal a time when there is a voltage valley, while other techniques adjust the switch on-time to equal a time when there may be no voltage valley. In other words, both the first and second example techniques utilize valley-to-valley switching, whereas other techniques operate at a single valley setting only. Because both the first and second example techniques utilize valley-to-valley switching, and switching at a valley is referred to as quasi-resonant switching, both the first and second example techniques may utilize quasi-resonant switching.

The first example technique utilizes an open loop scheme where controller 24 instantaneously adjusts the switch on-time from the time of one voltage valley to the time of another voltage valley, and rather than sensing the resulting current flowing through switch T0 and gradually adjusting the amount of current that flows through load 13, controller 24 instantaneously determines the switch operational parameters that are needed to keep the power delivered to load 13 the same immediately before the adjustment in the switch on-time and immediately after the adjustment in the switch on-time. In this sense, the first example technique may be considered as valley-to-valley switching with power compensation.

In the second example technique, controller 24 does not instantaneously adjust the switch on-time from the time of one voltage valley to the time of another voltage valley. Rather, controller 24 gradually adjusts the switch on-time from the time of one voltage valley through an intermediate on-time where the oscillating voltage is not at a voltage valley until the switch on-time is at a time of another voltage valley. This gradual adjustment to the switch on-time to another voltage valley causes the load current level or load voltage level to deviate from the target current load level or the target voltage load level. In this second example technique, rather than instantaneously determining the needed switch operational parameters in a open loop scheme, the second example technique relies on the feedback control loop to gradually adjust the switch operation parameters to correct for the deviation in the load current level or load voltage level from the target current load level or the target voltage load level. In this sense, the second example technique may be considered as a valley-to-valley with soft handover.

In some examples, for the first example technique, there may be no intermediate time when there is a decrease in the switching efficiency and driver 12 may not need to determine whether the switch on-time reached the voltage valley since driver 12 jumps instantaneously to the voltage valley, as compared to the second example technique. In some examples, for the second example technique, the amount of flicker that occurs to the valley-to-valley switching may be minimal due to the gradual adjustment of the switch on-time, as compared to the first example technique.

The following describes the first example technique in greater detail. For purposes of illustration and ease of description, the following describes the example of adjusting the switch on-time from switching period A to switching period C, and vice-versa. In the following, the switch on-duration when the switching period is switching period A is referred to as ton,1 and switching period A is referred to T1. The switch on-duration when the switching period is switching period C is referred to as ton,2 and switching period C is referred to as T2.

As described above, an instantaneous change in the switching period results in the stepwise jump in the power. For lighting, this stepwise jump in power appears as flicker and negatively impacts light quality. Accordingly, to avoid flicker, the power immediately before the change in the switching period and the power immediately after the change in the switching period should be the same (i.e., to achieve a transition in the switching period with constant power).

In the first example technique, a switch operational parameter (e.g., switch on-duration) needed to keep constant power at the adjustment from one voltage valley to another is based on the present switch on-duration, the present switching period, and the parasitic oscillation period (Tosc). For example, power delivered to load 13 equals:

$$P = \tfrac{1}{2} * Vin^2 * ton^2 / L/T \qquad \text{(eq. 1)}$$

In equation 1, Vin (input voltage) and L (inductance) are constant, meaning that $ton^2/T$ should be kept constant. In other words, $ton^2/T$ immediately before the adjustment in the switching period from T1 to T2 or T2 to T1 and immediately after the adjustment in the switching period from T1 to T2 or T2 to T1 should be the same. Accordingly, for an increase or decrease of the switching period T by Tosc, this results in:

$$ton2 = ton1 * \text{sqrt}((T1+Tosc)/T1) = ton1 * \text{sqrt}(1+Tosc/T1) \qquad \text{(eq. 2)};$$

$$ton1 = ton2 * \text{sqrt}((T2-Tosc)/T2) = ton2 * \text{sqrt}(1-Tosc/T2) \qquad \text{(eq. 3)}.$$

Equation 2 is for increasing the switch on-time from switching period A to switching period C (i.e., increase from T1 to T2). Equation 3 is for decreasing the switch on-time from switching period C to switching period A (i.e., decrease from T2 to T1). Also, as described above, the switch on-duration (e.g., ton1 and ton2) may affect the switch on-time (e.g., T1 and T2). In other words, the switch on-time is a function of the switch on-duration, but equation 2 and equation 3 are generated based on the approximation that the switching period is not a function of ton (i.e., T=f(ton), but equations 2 and 3 are based on an approximation that assumes that T!=f(ton)).

Controller 24 determines an on-time which compensates the change of the switching period at a valley change in quasi-resonant switching. In some examples, controller 24 may be a digital controller with limited processing capabilities, and performing the square-root operation may not be practical for controller 24. Rather than performing the square-root operation, in some examples, controller 24 may determine the square-root using look-up tables. In some examples, instead of using look-up tables, controller 24 may approximate the square root using its Taylor series:

$$(1+x)^{0.5} = 1 + (\tfrac{1}{2})x - (\tfrac{1}{8})x^2 + (\tfrac{1}{16})x^3 - (\tfrac{5}{128})x^4 + (\tfrac{7}{256})x^5 - \qquad \text{(eq. 4)}.$$

To reduce the processing that controller 24 needs to perform, controller 24 may compute the first two terms of the Taylor series and stop, with the result being an approximation of the actual square-root value. In this case, equations 2 and 3 simplify to:

$$ton2 = ton1 * (1 + Tosc/T1/2) = ton1 * (T1+Tosc/2)/T1; \qquad \text{(eq. 5)}$$

$$ton1 = ton2 * (1 + Tosc/T2/2) = ton2 * (T2-Tosc/2)/T2 \qquad \text{(eq. 6)}.$$

In each of equations 5 and 6, the latter form of the equations (i.e., ton1*(T1 +Tosc/2)/T1 for equation 5 and ton2*(T2−Tosc/2)/T2 for equation 6) is better for fixed point numbers as it reduces quantization noise by first multiplying and then dividing the result. Furthermore, the first example techniques are based on various approximation. Therefore, the final determined switch on-duration may not be exactly correct, but the feedback control loop of driver 12 corrects for any deviations from the exact values.

To test how well this first example technique works, it may be possible to measure the output voltage at the switch, if the measurement shows that switch on-duration (ton) and switch on-time (switching period) instantaneously change in a stepwise jump at the same time, this first example technique may be very useful. However, such an instantaneous change in the stepwise jump at the same time is not required for the first example technique to be effective.

Moreover, as described above, there may be two ways to set the switch on-duration: (1) set the on-duration time and (2) set the peak-current. Equations 1-3, 5, and 6 are applicable for the example where controller 24 sets the on-duration time to set the switch on-duration. The following describes the equations for the example where controller 24 sets the peak-current threshold amplitude to set the switch on-duration.

When the on-duration is set by the peak-current, the equation for power is:

$$P = \tfrac{1}{2} * L * Ipk^2 / T \qquad \text{(eq. 7)}.$$

Similar to above, L are constant, and so $Ipk^2/T$ is kept constant so that the power immediately before the change in the switch on-time and immediately after the change in the switch on-time is the same. Ipk is the peak-current threshold amplitude. Also, switch on-time (i.e., switching period T) is a function of Ipk, but the equations are generated based on the approximation that the switching period is not a function of Ipk (i.e., T=f(Ipk), but equations are based on the approximation that T!=f(Ipk)).

Similar to the equations 2 and 3:

$$Ipk2 = Ipk1 * \text{sqrt}((T1+Tosc)/T1) = Ipk1 * \text{sqrt}(1+Tosc/T1) \qquad \text{(eq. 8)};$$

$$Ipk1 = Ipk2 * \text{sqrt}((T2-Tosc)/T2) = Ipk2 * \text{sqrt}(1-Tosc/T2) \qquad \text{(eq. 9)}.$$

Similar to equations 5 and 6 with the Taylor series approximation:

$$Ipk2 = Ipk1 * (1+Tosc/T1/2) = Ipk1 * (T1+Tosc/2)/T1; \qquad \text{(eq. 10)}$$

$$Ipk1 = Ipk2 * (1+Tosc/T2/2) = Ipk2 * (T2-Tosc/2)/T2 \qquad \text{(eq. 11)}.$$

The following describes the second example technique in greater detail. In this example, a change from switching at one valley to another is not done in a jump, but using a slow sweep. In this example, the feedback control loop adjusts the switch operational parameters (e.g., switch on-duration based on the time or based on the peak-current) so that the average load current or average load voltage are approximately equal to the set load current level or set load voltage level.

In the second example technique, there may be a target valley N and a another switching period if the switching period is decreasing, and a target valley N and another switching period if the switching period is increasing. For ease of understanding, in the following, voltage valley 36 is referred to as N1 and voltage valley 40 is referred to as N2.

When the switching period needs to increase, controller 24 may set a switching period to the time of N1 (voltage valley 36) and may set the target valley to N2 (voltage valley 40). As described above, startup control 26 may have determined the Tosc, from which controller 24 may determine the timing of multiple voltage valleys after ZCD unit 32 detects the time of the zero crossing.

In this example, because the set switching period (N1) is smaller than the time of N2, driver 12 may keep switching at the time of N1. Controller 24 may gradually increase the switching period from N1 to N2, which allows the feedback control loop to compensate the amount of current that flows through load 13 for the increase in the switching period. When controller 24 determines that the voltage valley at N2 is reached by the gradual increase in the switching period, controller 24 sets the switching period to N2.

When the switching period needs to decrease, controller 24 may set the switching period to the time of N2 and may set the target valley to N1. In this example, because the set switching period (N2) is larger than the time of N1, driver 12 may keep switching at time of N2. Controller 24 may gradually decrease the switching period from N2 to N1, which allows the feedback control loop to compensate the amount of current that flows through load 13 for the decrease in the switching period. When controller 24 determines that the voltage valley at N1 is reached by the gradual decrease in the switching period, controller 24 sets the switching period to N1.

For instance, having determined the time between valleys N1 and N2 (e.g. Tosc if N1 and N2 are neighbor valleys, with N1 before N2), PWM unit 32 may support a mechanism to generate a timing for the switching period that is based on the time when N1 is detected plus or minus an adjustable delay. If a change from N1 to N2 is desired, the delay may be gradually increased from 0 to Tosc. If a change from N2 to N1 is desired, the delay may be gradually decreased from Tosc to 0. For example, to transition from N1 to N2, controller 24 may cause PWM unit 32 to gradually increase the switching time from N1 plus a delay between 0 and Tosc. The original switching period may be N1+0, then N1+0.01, then N1+0.02, and so forth until the switching period is N1+Tosc, which equals N2. In the reverse, from N2 to N1, the original switching period may be N2−0, then N2−0.01, then N2−0.02, and so forth until the switch period is N2−Tosc, which equals N1.

In the above example, an increase or decrease of the switching period by 0.01 is provided merely for ease of understanding and should not be considered limiting. A finer or coarser increase or decrease in the switching period is possible. For instance, the increase or decrease of the switching period, in this second example technique, may be considered as an analog increase or decrease in the switching period in which case the switching period is temporally at many intermediate switching periods between N1 and N2 in the increasing switching period or between N2 and N1 in the decreasing switching period. The first example technique may be considered as a digital increase or decrease in the switching period, where the switching period jumps from N1 to N2 or vice-versa, in which case, the switching period is not at any other intermediate switching period.

Also, similar to the first example technique, the switching period can be monitored by measuring the voltage at the switch. This second example technique may function well if measurements indicate that the switching period does not jump, but the sweeps from one valley to another. However, the second example technique may still function well even if there are minor or otherwise unperceivable jumps in the switching period.

For instance, the second example technique may be conceptualized as follows: the turn-on time of the switch may be set to a first time associated with voltage valley 36, and controller 24 may determine to adjust a turn-on time of the switch from the first time associated with voltage valley 36 so that an average amount of current flowing through load 13 or an average amount of voltage at load 13 is approximately equal to a target current load level or a target voltage load level. In this example, controller 24 may determine a second time associated with voltage valley 40. However, rather than stepwise jumping the turn-on time from the first time to the second time, controller 24 may gradually adjust the turn-on time in smaller step sizes. Conceptually, this can be considered as controller 24 adjusting the turn-on time so that the turn-on time of the switch is briefly at a time that is associated with a non-voltage valley. For instance, the turn-on time may be viewed as being adjusted so that the turn-on time is associated with each of the points on the oscillation between voltage valley 36 and voltage valley 40, whereas in the first example technique, the turn-on time jumps from the time associated with voltage valley 36 to the time associated with voltage valley 40. Stated another way, the first example technique may be considered as a digital adjustment of the turn-on time, while the second example technique may be considered as an analog adjustment of the turn-on time.

For example, controller 24 may adjust gradually the turn-on time of the switch such that during the gradual adjustment of the turn-on time of the switch, controller 24 adjusts the turn-on time of the switch to an intermediate time associated with the non-valley voltage in the oscillating voltage at the node of the switch (e.g., voltage peak 38). During the gradual adjustment, the feedback loop of controller 24 adjusts the operational parameters to keep the power level approximately constant. For example, during the gradual adjustment of the one or more switch operational parameters, controller 24 may adjust the one or more switch operational parameters to keep the amount of power delivered to the load approximately constant when the turn-on time is adjusted to the intermediate time associated with the non-valley voltage during the adjustment of the turn-on time from the first time to the second time.

For instance, in the first and second example techniques, assume that the turn-on time of the switch is set to a first time associated with voltage valley 36. Then, assume that the user changes the amount of current that should flow through load 13 (sets the target current level). In this case, with the turn-on time the same, the feedback loop of controller 24 adjusts the on-duration of the switch. However, at some point, the feedback loop of controller 24 can no longer adjust the on-duration to achieve the target current level.

In the first example technique, controller 24 causes a stepwise jump from the first time associated with voltage valley 36 to a second time associated with voltage valley 40, and sets one or more switch operational parameters such that the power is substantially the same. In this way, there is very little flicker. Then, the feedback loop of controller 24 keeps adjusting the on-duration of the switch until the current through load 13 equals the target current level.

In the second example technique, controller 24 gradually adjusts the turn-on time from the first time associated with voltage valley to a second time associated with voltage valley 40, and gradually adjusts switch operational parameters to keep the amount of power delivered approximately constant during the gradual adjustment of the turn-on time. Then, the feedback loop of controller 24 keeps adjusting the on-duration of the switch until the current through load 13 equals the target current level.

In this way, adjustment to the amount of current flowing through load 13 is possible while maintaining high switching efficiency. For instance, if the feedback loop of controller 24 is able to adjust the on-duration so that the current flowing through load 13 is equal to the target current level, then controller 24 may not adjust the turn-on time of the switch. However, when the feedback loop of controller 24 is incapable of adjusting the on-duration so that the current through load 13 is equal to the target current level, then controller 24 may adjust the turn-on time. To maintain switching efficiency, it may be desirable to adjust the turn-on time to a valley voltage, and then allow the feedback loop of controller 24 to further adjust the on-duration so that the current through load 13 is equal to the target current level.

The first example technique performs a jump in the turn-on time from one valley voltage to another. If no additional steps are taken, there would be flicker because of the instantaneous change in the current. To account of this, controller 24 determines what some switch operational parameters should be so that the power is substantially the same. This way, the turn-on time can jump from one valley voltage to another, but the power stays the same, and hence no flicker. The feedback loop may then take over and adjust the on-duration to achieve the target current level.

The second example technique performs gradual adjustment to the turn-on time from one valley voltage to another. During this gradual adjustment, the turn-on time is temporarily at a non-valley voltage, but the feedback loop is capable of controlling the on-duration so that the power level remains constant. Then, once controller 24 sets the turn-on time to a valley voltage, the feedback loop may take over and adjust the on-duration to achieve the target current level.

Although the above examples were described with a current level, the techniques are not so limited, and may be extended to a target voltage level. Also, in some examples, as described above, the target current level or a target voltage level may be based on the average amount of current flowing through load 13 or the average amount of voltage at load 13.

Figure 4:
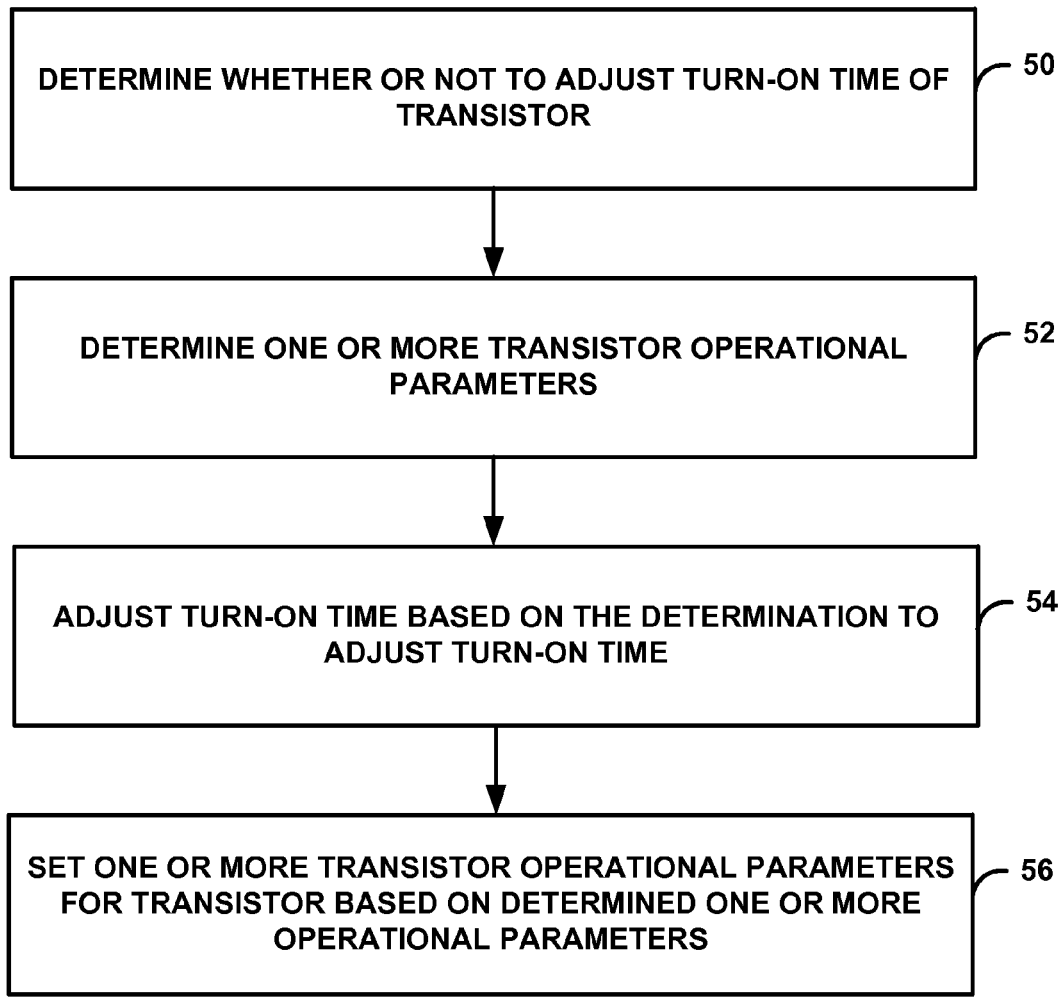
FIG. 4 is a flowchart illustrating a first example technique in accordance with this disclosure.

FIG. 4 is a flowchart illustrating a first example technique in accordance with this disclosure. In FIG. 4, controller 24 may determine whether or not to adjust a turn-on time of switch T0 from a first time associated with a first voltage valley (e.g., a time associated with valley voltage 36 or 40) in an oscillating voltage at a node of the switch T0 (e.g., drain node) to a second time associated with a second voltage valley (e.g., a time associated with valley voltage 40 or 36) in the oscillating voltage at the node of the switch (50).

For example, controller 24 may whether an adjustment to the switch on-time (i.e., turn-on time of switch T0) based on whether to adjust an amount of current flowing through the load so that an average amount of current flowing through the load or an average amount of voltage at the load is approximately equal to a target current load level or a target voltage load level. Also, the oscillating voltage occurs at a drain note (as one example) of switch T0 when switch T0 is off and there is no current flowing through a coil connected to switch T0 (e.g., coil 16).

Controller 24 may determine one or more switch operational parameters for the switch such that if the turn-on time is adjusted from the first time to the second time an amount of power delivered to the load is substantially the same immediately before the adjustment and immediately after the adjustment (52). In some examples, the one or more switch operational parameters comprise a time duration that defines how long the switch is turned on. In some examples, the one or more switch operational parameters comprise a peak-current threshold amplitude that defines how long the switch is turned on. Moreover, in some examples, controller 24 may implement an open loop scheme to determine the operational parameters where controller 24 may determine the one or more switch operational parameters without needing to determine an amount of current flowing through the switch.

Controller 24 may adjust the turn-on time of the switch to the second time based on the determination to adjust the turn-on time (54). Controller 24 may set the one or more switch operational parameters for the switch based on the determined one or more switch operational parameters (56). In some examples, controller 24 may cause PWM unit 32 to adjust the time when the switch is to turn on (e.g., adjust the turn-on time) simultaneously with setting the one or more switch operational parameters.

Figure 5:
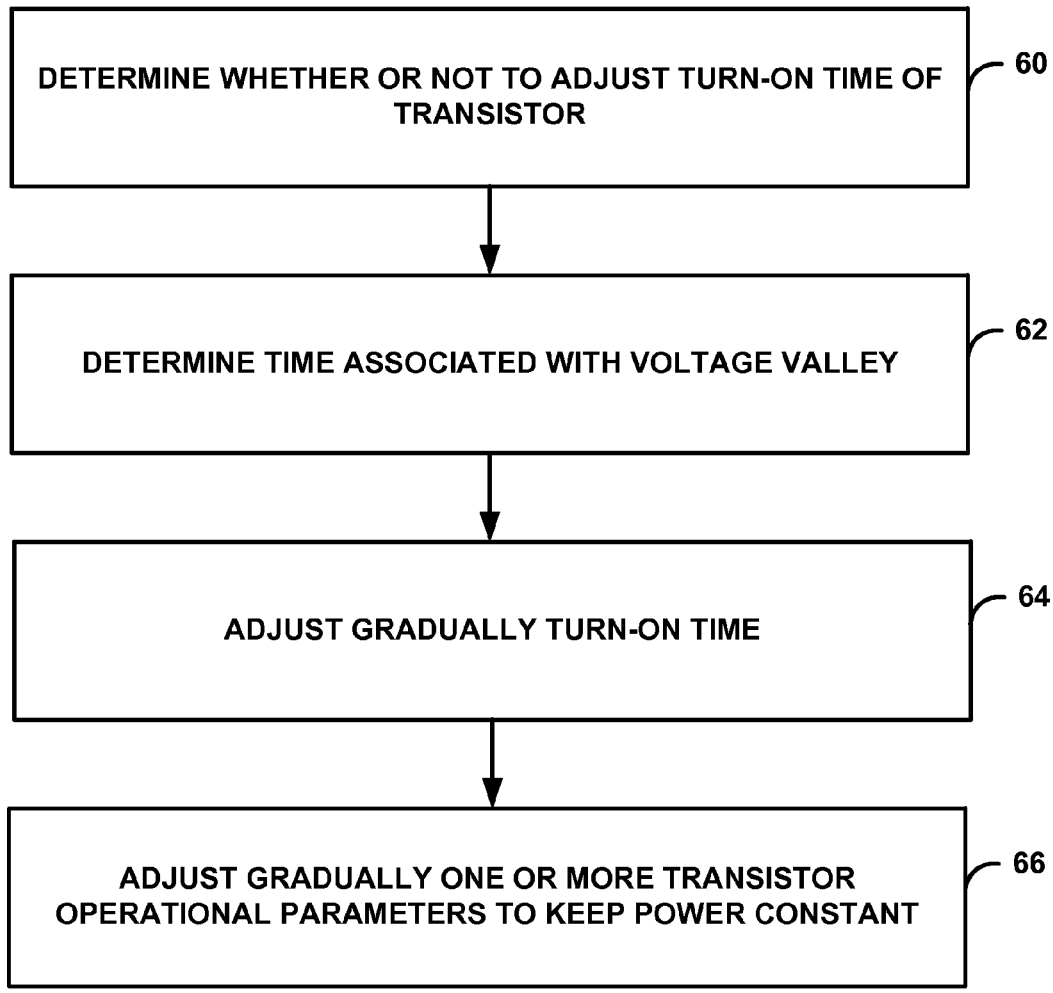
FIG. 5 is a flowchart illustrating a second example technique in accordance with this disclosure.

FIG. 5 is a flowchart illustrating a second example technique in accordance with this disclosure. Controller 24 may determine whether or not to adjust a turn-on time of a switch from a first time associated with a first voltage valley in an oscillating voltage at a node of the switch so that an average amount of current flowing through the load or an average amount of voltage at the load is approximately equal to a target current load level or a target voltage load level (60). Also, the oscillating voltage occurs at a drain node of the switch when the switch is off and there is no current flowing through the coil connected to the switch.

Controller 24 may determine a second time associated with a second voltage valley in the oscillating voltage (62). For example, controller 24 may determine the second time associated with the second voltage valley in the oscillating voltage based on a time when a current through coil 16 reaches zero (e.g., based on an indication from ZCD unit 30). Controller 24 may adjust gradually the turn-on time of the switch from the first time to the second, through an intermediate time associated with a non-valley voltage in the oscillating voltage at the node of the switch, based on the determination to adjust the turn-on time (64). Controller 24 may adjust gradually one or more switch operational parameters for the switch to keep the amount of power delivered to the load approximately constant during the gradual adjustment of the turn-on time of the switch from the first time to the second time (66).

For example, during the gradual adjustment of the turn-on time of the switch, controller 24 may adjust the turn-on time of the switch to the intermediate time associated with the non-valley voltage in the oscillating voltage at the node of the switch. Also, during the gradual adjustment of the one or more switch operational parameters, controller 24 may adjust the one or more switch operational parameters to keep the amount of power delivered to the load approximately constant when the turn-on time is adjusted to the intermediate time associated with the non-valley voltage during the adjustment of the turn-on time from the first time to the second time.

As one example, controller 24 may adjust gradually with a feedback control loop that senses the amount of the current flowing through the switch during the gradual adjustment of the turn-on time of the switch from the first time to the second time. In some examples, the one or more switch operational parameters comprise a time duration that defines how long the switch is turned on. In some examples, the one or more switch operational parameters comprise a peak-current threshold amplitude that defines how long the switch is turned on.

In one or more examples, the functions described may be implemented in hardware, software, firmware, or any combination thereof. If implemented in software, the functions may be stored on, as one or more instructions or code, a computer-readable medium and executed by a hardware-based processing unit (e.g., controller 24 of driver 12). Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., controller 24 of driver 12), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for controlling power delivered to a load, the method comprising:

comparing an amount of current flowing through the load or an amount of voltage to the load to a target current load level or a target voltage load level;

determining, based on the comparison to the target current load level or the target voltage load level at the load, whether or not to adjust a time to turn on a switch from a first time when a first voltage valley occurs in an oscillating voltage at a node of the switch to a second time when a second voltage valley occurs in the oscillating voltage at the node of the switch;

selecting one or more switch operational parameters for the switch and determining an amount of change for the one or more switch operational parameters such that if the time to turn on the switch is adjusted from the first time to the second time the change to the one or more switch operational parameters results in an amount of power delivered to the load to be substantially the same immediately before the time adjustment and immediately after the time adjustment;

adjusting the time to turn on the switch to the second time based on the comparison; and changing the one or more switch operational parameters for the switch by the determined amount of change, immediately within a next subsequent switching period after the time adjustment and based on the determined amount of change such that the amount of power delivered to the load is substantially the same to compensate for the adjusted time to turn on the switch, wherein the switching period is the amount of time between one instance of the time to turn on the switch and another instance of the time to turn on the switch.

2. The method of claim 1, wherein adjusting the time to turn on the switch to the second time and changing the one or more switch operational parameters comprises adjusting the time to turn on the switch to the second time simultaneously with changing the one or more switch operational parameters.

3. The method of claim 1, wherein the one or more switch operational parameters comprise a time duration that defines how long the switch is turned on.

4. The method of claim 1, wherein the one or more switch operational parameters comprise a peak-current threshold amplitude that defines how long the switch is turned on.

5. The method of claim 1, wherein determining the change to the one or more switch operational parameters comprises determining the change to the one or more switch operational parameters without determining an amount of current flowing through the switch.

6. The method of claim 1, wherein determining whether or not to adjust the time to turn on the switch comprises determining whether or not to adjust the amount of current flowing through the load or adjust the amount of voltage to the load so that an average amount of current flowing through the load or an average amount of voltage at the load is approximately equal to the target current load level or the target voltage load level.

7. The method of claim 1, wherein the oscillating voltage occurs at a drain node of the switch when the switch is off and there is no current flowing through a coil connected to the switch.

8. The method of claim 1, wherein the target current load level is non-zero and the target voltage load level is non-zero.

9. The method of claim 1, wherein the second voltage valley is an earlier voltage valley to the first voltage valley.

10. A driver system for controlling power delivered to a load, the driver system comprising:

a transformer comprising a primary side that includes a first coil and a secondary side that includes a second coil, wherein the load is connected to the second coil;
a switch coupled to the first coil; and
a driver coupled to the switch that is coupled to the first coil, wherein the driver is configured to:
compare an amount of current flowing through the load or an amount of voltage to the load to a target current load level or a target voltage load level;
determine, based on the comparison to the target current load level or the target voltage load level at the load, whether or not to adjust a time to turn on the switch from a first time when a first voltage valley occurs in an oscillating voltage at a node of the switch to a second time when a second voltage valley occurs in the oscillating voltage at the node of the switch;
select one or more switch operational parameters for the switch and determine an amount of change for the one or more switch operational parameters such that if the time to turn on the switch is adjusted from the first time to the second time the change to the one or more switch operational parameters results in an amount of power delivered to the load to be substantially the same immediately before the time adjustment and immediately after the time adjustment;
adjust the time to turn on the switch to the second time based on the comparison; and
change the one or more switch operational parameters for the switch by the determined amount of change, immediately within a next subsequent switching period after the time adjustment and based on the determined amount of change such that the amount of power delivered to the load is substantially the same to compensate for the adjusted time to turn on the switch, wherein the switching period is the amount of time between one instance of the time to turn on the switch and another instance of the time to turn on the switch.

11. The driver system of claim 10, wherein the transformer further comprises a sensing side that includes a third coil, and wherein driver is configured to determine the first time associated with the first voltage valley and the second time associated the second voltage valley based on the sensing side sensing the voltage at the node of the switch and a zero crossing detection unit determining when the sensed voltage crosses zero.

12. The driver system of claim 10, wherein to adjust the time to turn on switch to the second time and change the one or more switch operational parameters, the driver is configured to adjust the time to turn on the switch to the second time simultaneously with changing the one or more switch operational parameters.

13. The driver system of claim 10, wherein the one or more switch operational parameters comprise a time duration that defines how long the switch is turned on.

14. The driver system of claim 10, wherein the one or more switch operational parameters comprise a peak-current threshold amplitude that defines how long the switch is turned on.

15. The driver system of claim 10, wherein to determine the change to the one or more operational parameters, the driver is configured to determine the change to the one or more operational parameters without determining an amount of current flowing through the switch.

16. The driver system of claim 10, wherein to determine whether or not to adjust the time to turn on the switch, the driver is configured to determine whether or not to adjust the amount of current flowing through the load or adjust the amount of voltage to the load so that an average amount of current flowing through the load or an average amount of voltage at the load is approximately equal to the target current load level or the target voltage load level.

17. The driver system of claim 10, wherein the oscillating voltage occurs at a drain node of the switch when the switch is off and there is no current flowing through the first coil.

18. A driver for controlling power delivered to a load, the driver comprising:
a controller configured to:
compare an amount of current flowing through the load or an amount of voltage to the load to a target current load level or a target voltage load level;
determine, based on the comparison to the target current load level or the target voltage load level at the load, whether or not to adjust a time to turn on a switch from a first time when a first voltage valley occurs in an oscillating voltage at a node of the switch to a second time when a second voltage valley occurs in the oscillating voltage at the node of the switch; and
select one or more switch operational parameters for the switch and determine an amount of change for the one or more switch operational parameters such that if the time to turn on the switch is adjusted from the first time to the second time the change to the one or more switch operational parameters results in an amount of power delivered to the load to be substantially the same immediately before the time adjustment and immediately after the time adjustment; and
a pulse width modulation (PWM) unit configured to:
adjust the time to turn on the switch to the second time based on the comparison; and
change the one or more switch operational parameters for the switch by the determined amount of change, immediately within the next subsequent switching period after the time adjustment and based on the determined amount of change such that the amount of power delivered to the load is substantially the same to compensate for the adjusted time to turn on the switch, wherein the switching period is the amount of time between one instance of the time to turn on the switch and another instance of the time to turn on the switch.

19. The driver of claim 18, wherein the controller is configured to cause the PWM unit to adjust the time to turn on the switch to the second time simultaneously with changing the one or more switch operational parameters.

20. The driver of claim 18, wherein the one or more switch operational parameters comprise one of:
a time duration that defines how long the switch is turned on; or
a peak-current threshold amplitude that defines how long the switch is turned on.

* * * * *